(12) United States Patent
Felter et al.

(10) Patent No.: US 7,302,839 B1
(45) Date of Patent: Dec. 4, 2007

(54) METHOD AND SYSTEM FOR GATHERING PRESSURE SIGNATURE DATA USING A SCALED MODEL IN A WIND TUNNEL

(75) Inventors: John Felter, Wichita, KS (US); Michael Thacker, Valley Center, KS (US); Kelly Laflin, Andover, KS (US)

(73) Assignee: Cessna Aircraft Company, Wichita, KS (US)

( * ) Notice: Subject to any disclaimer, the term of this patent is extended or adjusted under 35 U.S.C. 154(b) by 0 days.

(21) Appl. No.: 11/425,909

(22) Filed: Jun. 22, 2006

(51) Int. Cl.
 *G01M 9/00* (2006.01)
(52) U.S. Cl. ..................................... 73/147; 73/170.02
(58) Field of Classification Search .................. 73/147, 73/170.02, 170.01
 See application file for complete search history.

(56) References Cited

U.S. PATENT DOCUMENTS

| | | | |
|---|---|---|---|
| 6,698,684 B1 | 3/2004 | Henne et al. | |
| 6,729,577 B2 | 5/2004 | Morgenstern | |
| 6,824,092 B1 | 11/2004 | Franklin, III et al. | |
| 6,854,687 B1 | 2/2005 | Morgenstern et al. | |
| 6,921,045 B2 | 7/2005 | Chang et al. | |
| 6,942,178 B2 | 9/2005 | Morgenstern et al. | |
| 2005/0045764 A1 | 3/2005 | Morgenstern et al. | |
| 2005/0067525 A1 | 3/2005 | Morgenstern et al. | |

OTHER PUBLICATIONS

George, A.R., "Lower Bounds For Sonic Booms In the Midfield," AIAA Journal, vol. 7, No. 8, pp. 1542-1545, Aug. 1969.

George, A.R. and Seebass, R., "Sonic Boom Minimization Including Both Front and Rear Shocks," AIAA Journal, vol. 9, No. 10, pp. 2091-2093, Oct. 1971.

Graham, David H; Dahlin, John A.; Meredith, Keith B.; and Vadnais, Jay L., "Aerodynamic Design Of shaped Sonic Boom Demonstration Aircraft," 43rd AIAA Aerospace Sciences Meeting And Exhibit, pp. 1-7, Jan. 10-13, 2005.

Henne, Preston A., "Small Supersonic Civil Aircraft," Presentation at Aircraft Noise And Emissions Reduction Symposium, May 24-26, 2005.

Lyman, Victor and Morgenstern, John M., "Calculated And Measured Pressure Fields For An Aircraft Designed For Sonic-Boom Alleviation,", 22nd Applied Aeronautics Conference, pp. 1-7, Aug. 16-19, 2004.

(Continued)

*Primary Examiner*—Andre J. Allen
(74) *Attorney, Agent, or Firm*—Lathrop & Gage LC

(57) ABSTRACT

Disclosed is a method of and system for gathering off-body pressure signature data from a scaled model in a wind tunnel. The data is gathered using a probe having multiple longitudinally disposed static pressure ports. Because of the number of ports and their spacing, the probe is able to remain stationary in the tunnel for the entire range of Mach numbers and model positions to be tested. Thus, tunnel flow characteristics can be easily and effectively removed. The system also has an automated model positioning system which enables settings at different pitch, yaw, and roll angles. This enables the user to locate the model so that it can be traversed at a fixed distance above the probe while maintaining the desired angular orientation of the model. By repeatedly traversing the model at different angular orientations, a detailed and accurate off-body pressure distribution can be obtained. The wind tunnel test technique captures full off-body pressure signatures in a complete 360 degree azimuthal range.

20 Claims, 2 Drawing Sheets

OTHER PUBLICATIONS

Mack, Robert J. and Needleman, Kathy E., "a Methodology For Designed Aircraft To Low Sonic Boom Constraints," NASA Technical Memorandum 4246, pp. 1-23, 1991.

Mohammadi, Bijam, "Optimization Of Aerodynamic And Acoustic Performance Of Supersonic Civil Transports," pp. 285-296, Center For Turbulance Research Proceedings of the Summer Program 2002.

Mohammadi, Bijan, and Pironneau, Olivier, "Shape Optimization In Fluid Mechanics," Annu. Rev. Fluid Mech., pp. 255-279, 2004.

Morgenstern, John M., "Wind Tunnel Testing of a Sonic Boom Minimized Tail-Braced Wing Transport Configuration," AIAA 2004-4536, 2004.

Plotkin, Kenneth J., Sonic Boom: Origins, Modeling And Effects, Wyle Laboratories, pp. 1-43, Jun. 8-9, 2004.

Pawlowski, Joseph W.; Graham, David H., and Boccadoro, Charles H., "Origins And Overview Of The Shaped Sonic Boom Demonstration Program," 43rd AIAA Aerospace Sciences Meeting And Exhibit, pp. 1-14, Jan. 10-13, 2005.

Seebass, A.R. and George, A.R., "Design And Operation Of Aircraft To Minimize Their Sonic Boom," J. Aircraft, vol. 11, No. 9, pp. 509-517, Sep. 1974.

Seebass, Richard and Argrow, Brian, Sonic Boom Minimization Revisited, American Insititue Of Aeronautics And Astronautics, Inc., AIAA-98-2956, pp. 1 14, 1998.

Tam, Tim; Ruffin, Stephen; Gage, Peter; Yates, Leslie; and Morgenstern, John Sonic Boom Testing Of Artificially Blunted Leading Edge (Able) Concepts In The NASA AMES Aeroballistic Range, pp. 1-13, AIAA 2000-1011, 2000.

Whitham, "Sonic Booms," Extensions of the Theroy, Section 9.3, p. 337, 1974.

Vazquez, Mariano and Dervieux, Alain, "Sonic Boom Optimization Of A Supersonic Business Jet," 2002-2003.

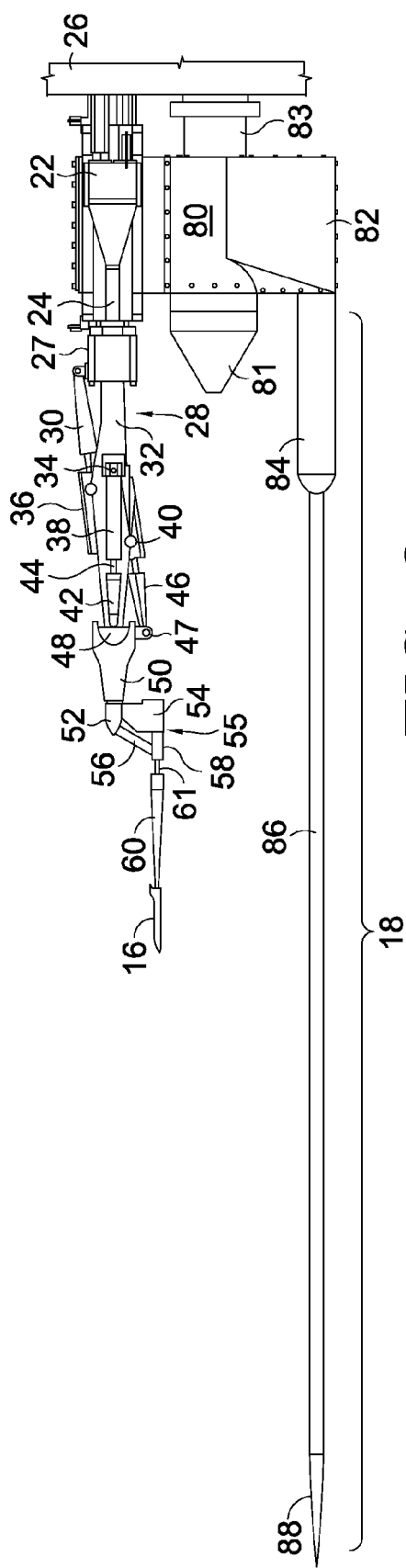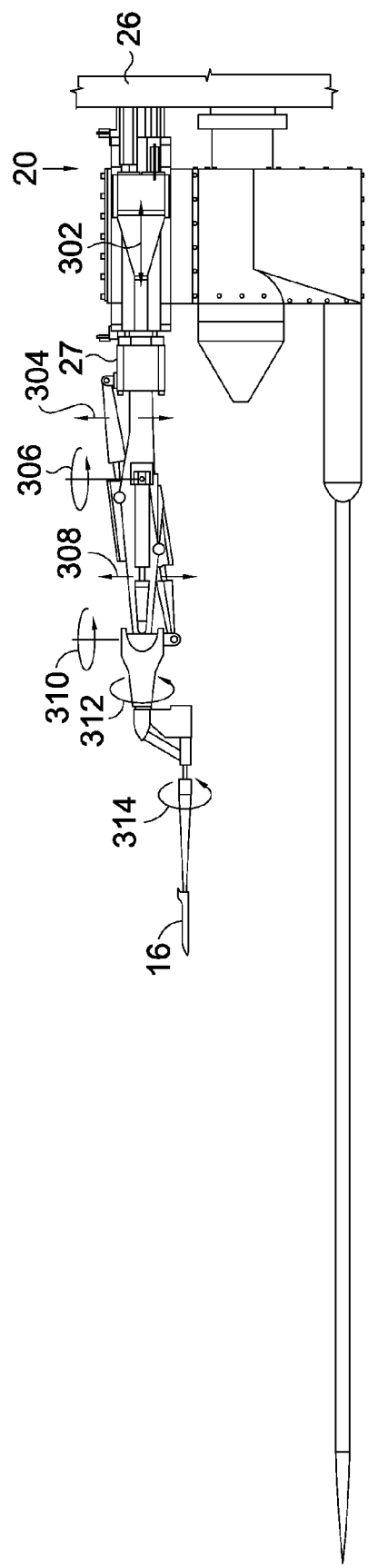

METHOD AND SYSTEM FOR GATHERING PRESSURE SIGNATURE DATA USING A SCALED MODEL IN A WIND TUNNEL

CROSS-REFERENCE TO RELATED APPLICATIONS

None

STATEMENT REGARDING FEDERALLY SPONSORED RESEARCH OR DEVELOPMENT

None

BACKGROUND OF THE INVENTION

1. Field of the Invention

The present invention relates generally to the field of wind tunnel testing of aircraft designs. More specifically, the present invention is a method of and system for gathering off-body pressure signature data from a scaled model.

2. Description of the Related Art

As a consequence of the high public annoyance to the noise generated by sonic booms, Federal regulations currently prohibit supersonic overland flight by commercial aircraft. Sonic boom suppression of supersonic aircraft is desirable to decrease public annoyance, and, thereby allow unrestricted supersonic flight overland. To validate design, an efficient, accurate method of gathering off-body pressure signature data using a scaled model in a wind tunnel is needed.

The general process of performing wind tunnel tests to gather off-body pressure signatures of scaled models is known technology. The conventional method uses one or more single port static pressure probes. Various means of gathering the extent of the signature have been employed. These include fixing the model position in the tunnel and traversing the probe; fixing the probe position and traversing the model; or a combination of these two techniques such that the extent of the off-body pressure signature is measured. Either model or probe may be traversed mechanically or manually. Pressure measurements may be taken continuously while either model or probe is traversed at a constant rate or be taken in a traverse/pause mode. In the transverse/pause mode all movement is halted and the pressure field is allowed to become fully static before each pressure reading is recorded. After the data is collected, the model/probe relative position is changed by a fixed distance and data is once again gathered. This process is repeated until the entire distance of interest is covered.

The preferred method of off-body pressure signature measurement is to mechanically traverse the model with the probe in a fixed position; this process minimizes variability in the probe measured pressures. Repositioning the probe in the tunnel between measurements introduces errors to the reading. This is because the probe not only sees the pressure signature data gleaned from the model, but also receives undesirable flow characteristics of the tunnel due to the new location. Every unique position in a wind tunnel will present unique error data which must be mathematically eliminated from the end product data. This is due, e.g., to structural irregularities, shock wave reflection, and air velocity fluctuations. Because the probe must be moved over and over between readings to develop the bulk data set, the elimination of error data must be dealt with repeatedly. This makes the process very time intensive and difficult to perform. Further, extraneous character is incorporated into the data that does not represent the model.

It is desirable to measure off-body pressure signatures at several Mach numbers to thoroughly assess the aircraft design. The angles at which pressure waves emanate from the model are dependent on Mach number (i.e., the Mach angle). Therefore, collecting off-body pressure measurements at varying Mach numbers while maintaining a constant model height above the probe necessitates that the relative traverse position of the model and probe be varied. This may entail the unfavorable requirement of physically changing the fixed location of the probe in an effort to measure the extent of the pressure signature of interest. Not only will this cause undesirable variability in the data as stated above, it requires additional time and effort, reducing the efficiency and productivity of the testing procedure.

Similar to the above limitation, relocation of the fixed probe may be necessary if the Mach number is held constant but the model height above the probe is altered. In this scenario, the pressure wave sweep angles do not change, but because the model height above the probe changes, the pressure signature traverse position at the probe height changes. The probe must be repositioned in order to measure the extent of pressure signature. It is the conventional practice to collect pressure measurements at an array of conditions that include variations in both Mach number and model height.

Therefore, there is a need in the art for a system and method which enables the development of detailed signature data without the disadvantages noted above.

SUMMARY OF THE INVENTION

The preferred embodiment of the present invention is a method of and system for gathering off-body pressure signature data from a scaled model in a wind tunnel. According to the processes of one embodiment, data is gathered using a stationary probe having a plurality of pressure sensors. Also included in another embodiment of the present invention, an automated model positioning system enables settings at different pitch, yaw, and roll angles. This enables the user to angularly orientate the model so that it can be traversed while maintaining the desired angular orientation. Detailed and accurate data can be obtained from these processes.

BRIEF DESCRIPTION OF THE SEVERAL VIEWS OF THE DRAWINGS

The present invention is described in detail below with reference to the attached drawing figures, wherein:

FIG. 2 is a side view of the system of the present invention.

FIG. 3 is a side view including arrows showing the degrees of movement afforded by the support apparatus of the present invention.

DETAILED DESCRIPTION OF THE INVENTION

Figure 1:
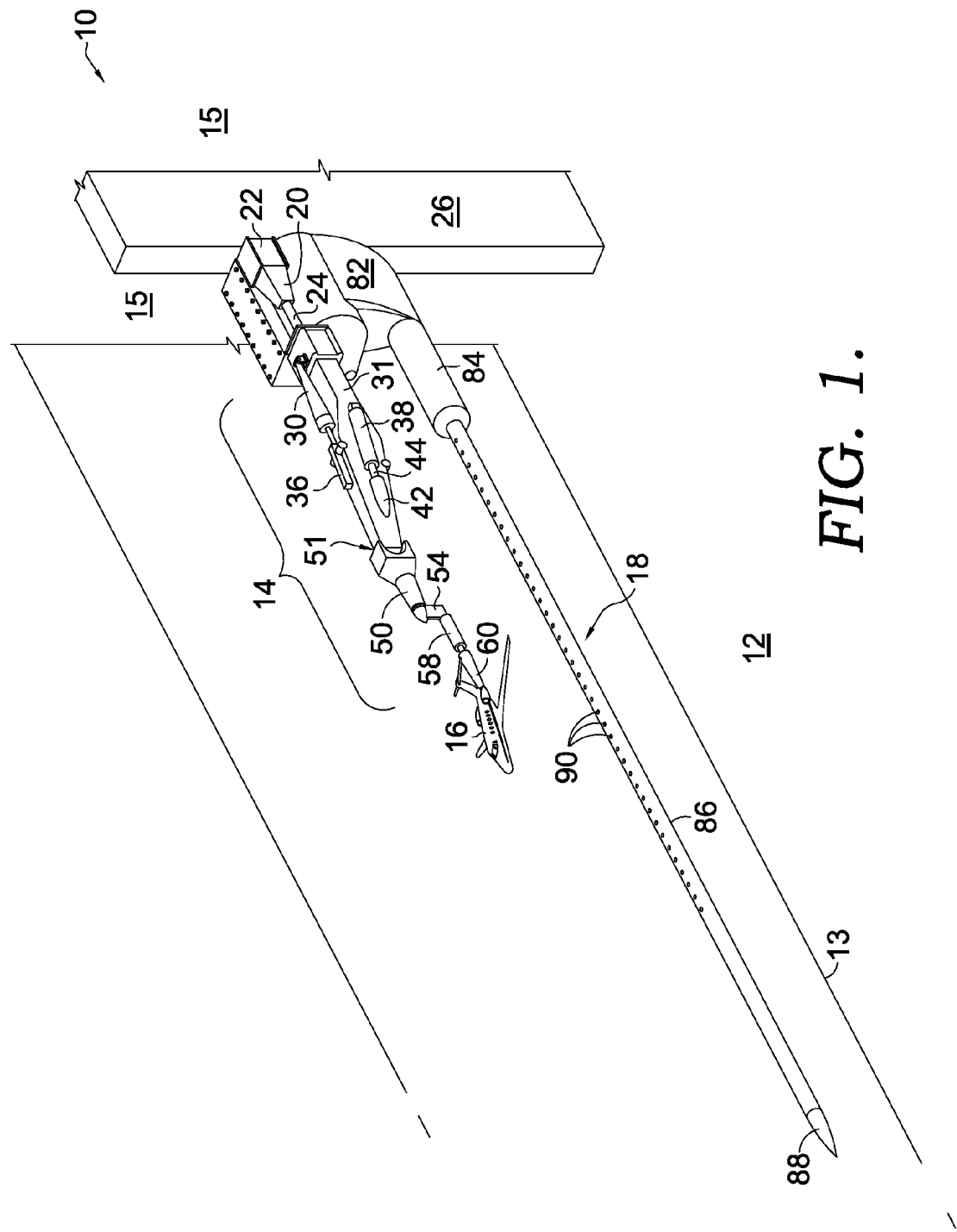
FIG. 1 is a perspective view of the system of the present invention showing it disposed in a wind tunnel.

The present invention provides a system and method for measuring off-body pressure signatures in a wind tunnel which overcomes the disadvantages in conventional systems. This has been done by providing multiple static pressure ports and by facilitating continuous controlled positioning of the model relative to the pressure ports. In the preferred embodiment of the present invention, a long static pressure probe is provided to support the ports, which are evenly distributed along the length of the probe. In the preferred embodiment, 39 ports are distributed along the length of the probe at a spacing of 50 mm. It is of course possible that other arrangements could be used which would fall within the scope of the invention. It is anticipated that one skilled in the art would recognize that the number, spacing, and other properties of the system would likely be changed for different applications, models, wind tunnels, and other test variables.

Because of the number of ports and their spacing, the probe is able to remain stationary in the tunnel for the entire range of Mach numbers to be tested. Because the probe does not have to be moved to test from multiple predefined locations, tunnel flow characteristics can be easily and effectively removed, and there will be no data corruption caused like with the conventional methods which require relocation of the static pressure probe. Thus, the data collected will be much more certain.

The system of the present invention also enables model positioning ability which enables new testing possibilities. A model support system is provided. These kinds of systems like that used here are sometimes referred to as captive trajectory systems. The captive trajectory system (CTS) used along with the present invention has the ability to position the model anywhere within a specified volume in the wind tunnel test section at combinations of pitch and roll angles. This enables the user to locate the model so that it can be traversed at a fixed distance above the probe while maintaining the required pitch and roll angles. The model is also able to be positioned at varying distances from the probe in combination with roll and pitch angles being duplicated from other model to probe spacing.

In addition to the basic ability to position the model, the CTS has the ability to traverse the model at varying rates. This allows the user to test at various traverse rates in order to quantify the effect of traverse rate on the data.

Data collection efficiency is greatly improved using the disclosed system. Because the probe has sufficient ports to cover the signature over the entire Mach number range and model to probe spacing, there is no need to stop the tunnel to reposition the test hardware. This eliminates the requirement in the conventional systems of continually establishing data corrections to correct for errors resulting from moving the probe around to different locations. For example, the test equipment itself creates shock waves which must be factored out in the prior art systems. But with the fixed port system of the present invention, these errors remain constant. Pressure reflection errors (caused by reflection off of the wind tunnel side walls) are also minimized because of the arrangement of the present invention. Further, because the model can be repositioned without having to stop the tunnel, the CTS has the ability to continuously traverse (or otherwise move) the model relative to the probe which also improves the productivity of this test technique.

There is also great improvement in the appreciable robustness of the data produced. Because the entire boom signature is seen by the multiple pressure ports on the probe, this test technique provides repeatability and uncertainty data without adding additional runs to the test program.

A preferred embodiment of the system of the present invention may be seen in FIGS. 1-3. Referring first to FIG. 1, the preferred embodiment for a system 10 can be seen in perspective. System 10 is disposed inside a wind tunnel corridor 12 of which the top, and front have been removed so that the invention is adequately revealed. The lower back corner 13 and an open back 15 of the wind tunnel are shown, however. In terms of flow, when in normal operation, high speed flow will be directed from the left front of the tunnel and out the rear opening 15.

Disposed inside a wind tunnel is a support 14 for a model 16. Below support 14 is a probe 18 which is used to take off-body pressure readings from the flow field induced by the model 16 as will be described in more detail hereinafter. Support 14 is supported on an outcropping 26 which is a part of and fixed to the overall wind tunnel structure.

The details regarding the components of support 14 can be seen looking to both FIG. 1 and also the FIG. 2 side view of the system of the present invention. First, a translational mechanism 20. Translational mechanism 20 comprises an electric motor 22/jack screw 24 arrangement which will be known to those skilled in the art. This is the portion of support 14 responsible for translating the model up and downstream in the tunnel. One skilled in the art will recognize that other known CTS arrangements capable of providing translation could be used as well and would still fall within the scope of the present invention. One skilled in the art will also recognize that these kinds of systems are normally controlled using electric motors and jack screws, computer systems, and other automated support. Reference to FIG. 3 will reveal that these features create a translational movement option 302, as shown. This translation can be made at different rates if desired.

A first portion 28 of support 14 enables a first option of angular movement 304 between the longitudinal body axis and the horizontal plane as shown in FIG. 3. Portion 28 is supported on a part 27 and includes an upper electric motor and jack screw 30 which is pinned into a member 36 to create rotation relative to a base member 32 about a hinge 34.

An angular rotation option 306 for displacement in the horizontal plane is provided using a lateral electric motor/jack screw 38 displaced about a hinge having a vertical axis at point 34. This rotation option contributes to the yaw setting for model 16, and also allows for deviation laterally from the longitudinal axis.

Another portion of support 14 enables a second option of angular movement 308 between the longitudinal body axis and the horizontal plane. Angular movement 308 is enabled by an electric motor/jack screw arrangement 46 which is hinged at points 40 and 47 to enable pitch control to model 16 as well as displacement above and below probe 18.

An angular rotation option 310 relative to horizontal is also provided using the lateral electric motor/jack screw 38 (like with option 306), but in this case the rotation is made about a hinge having a vertical axis at point 48. This rotation option, in combination with that of option 306, enables the yaw setting for model 16 as well as lateral displacement.

Both as a first means of axial rotation 312 and a second means of axial rotation 314 enable rotation about the longitudinal axis of the support. Means 312 enables contribution to the models roll setting as well as slightly contributing to displacement from the longitudinal axis. Means 314 solely contributes to the roll setting for the model, and is able to be rotated independently of means 312.

Structurally, rotation means 312 is taken about the center longitudinal axis of a body 50 by a bracket 55. As can be seen in FIG. 2, bracket 55 comprises a hub 52, a main portion 54, a protruding portion 58, and a reinforcement member 56.

Means 314 is taken about the center axis of protruding portion 58 which receives a rod 61 which is fixed to a tapered model perch 60. Perch 60, which directly supports model 16, is tapered as shown such that it avoids aerodynamic interference with readings taken by probe 18.

Because support 14 includes the six degrees of freedom of movement (e.g., displacement in the x, y, and z directions and also in three angular directions) enabled by translation means 302 and pivot points 304, 306, 308, 310, 312, and 314, the model is able to be translated to any desirable three dimensional position, and also can be set at any desired roll, pitch, or yaw.

One skilled in the art will recognize that numerous control systems (e.g., computer automation, hydraulics, electrical, mechanical) will be required to accomplish the objectives of the CTS employed here. The specifics in how these necessary automated controls are accomplished are within the realm of what is known to those skilled in the art.

Because of the many degrees of freedom afforded by support 14, the model is able to be continuously moved during tests. For example, model 16 can be translated from downstream to upstream (or visa versa) at the same time readings from probe 18 are being continuously recorded. The rate of translation can also be varied. It is also possible that the model's roll pitch or yaw be altered during the course of testing.

In order to accommodate the continuously movable model/support arrangement, probe 18 is fixed at a position underneath and substantially parallel to support 14. Because probe 18 is always fixed in place, it will not change the aerodynamics of the wind tunnel during a test run.

Structurally, probe 18 is secured to outcropping 26. More specifically, a downwardly depending supporting flange 82 of a base member 80 supports the probe on the outcropping 26 on a portion 83. A section 84 with a tapered end provides reinforcement. It has been made thicker to prevent structural failures which might be caused by the leverage created at the base of the elongated probe 18 during testing. A main section 86 of the probe is where a plurality of static pressure ports 90 are located. Each of the ports is plumbed to a pressure transducer (a diaphragm/strain gauge arrangement which can be either a static or dynamic device) which enables pressure change measurements as will be known by one skilled in the art. In the preferred embodiment, 39 pressure ports are distributed along the length of the probe at a spacing of 50 mm. Other numbers and displacements could be used, of course, to accomplish different testing objectives. At the upstream end of the probe, a nose cone 88 is provided to minimize aerodynamic impact.

In operation, the system is used as follows. First, the wind tunnel is run with only the CTS system and the pressure probe installed in the test section. The various tunnel conditions of interest are run to establish a baseline set of data for a tunnel condition without the model present. This establishes a static pressure tare which will be removed from the data collected with the model installed in the tunnel. Next, the CTS system will be translated forward and aft at varying speeds to establish a second static pressure tare. This second tare will also be removed from the data generated with model 16 to correct for any disturbances created by the movement of the CTS system.

Once these preliminaries have been accomplished, model 16 is positioned at a starting point. As discussed above, this original position comprising a translational starting point, and also an initial roll, pitch, and yaw, will be reached using the automated control systems known in the CTS art. In the preferred embodiment, model 16 will be maintained at the same distance from probe 86 when in translation. To do this, a point substantially near the center of model 16 is selected.

The CTS system can be automated such that it will maintain the model at a substantially constant distance from the probe despite changes made to pitch and roll for the purpose of testing.

To begin the actual test, the wind tunnel will be activated causing air to move and impinge upon model 16. Once a desired velocity is reached and maintained in the tunnel, (e.g., Mach 1.2), readings can be taken from at least some, but most likely all of the pressure ports 90. These readings are taken and recorded.

Because the probe is displaced from, but substantially parallel to the trajectory of the model, the readings taken from each port can be compared against the other for determining repeatability. For example, assume that a first port in plurality 90 takes a first reading from a first distance and relative position to the model center. When the model traverses (either up or down wind in the tunnel), it will then later encounter a second port which is at the same distance and relative position from the model center. Thus, the readings from this second port can be compared to those taken of the first port for the purpose of determining reliability and repeatability.

One skilled in the art will recognize that data read from these ports can be used to generate pressure-signature information regarding the model. In the preferred embodiment, the model can then be moved continuously at a selected rate of translation while readings are continually taken and recorded. For example, in one embodiment the model is translated longitudinally (either upwind of downwind in the tunnel) while continually taking readings from the start position to a final end position. Next, one of the angular orientation variables (roll, pitch or yaw) will be changed, and the model again translated longitudinally. The translation process is then repeated for a plurality of different angular orientation settings. For example, to develop a 360 degree pressure signature of the model, the roll angle for the plane could displaced 15 degrees between each translation/run. The 16 translation runs would then produce data sets for each of the 16 roll angles tested giving the user volumes of data which would take many more runs if performed using the conventional methods.

The same is true for pitch and yaw. These angular orientations could be manipulated as well between translations to develop informative pressure signature information.

Also possible, is that the angular orientations of roll, pitch, and yaw for the model could be continuously changed with or without translation if the tester found doing so to provide meaningful data sets.

Regardless, the systems and methods described above achieve advantages not before realized. The wind tunnel test technique that captures full off-body pressure signatures in a complete 360 degree azimuthal range with infinite increments without changing the spatial relationship between the model and the measurement probe or tunnel. Further, because the measurements can be taken in a single run, the quantification of the measurements does not add to the duration of the test.

As can be seen, the present invention and its equivalents are well-adapted to provide a new and useful system and method for obtaining full off-body pressure signatures from a model in a wind tunnel. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out order described.

The invention claimed is:

1. A system for taking pressure readings from a model in a wind tunnel, said system comprising:
    a plurality of static pressure ports defined in a common member;
    a support for said model, said support being adapted to enable one of translation and rotation of said model while maintaining a desired distance from said common member for said plurality of static pressure ports, said ports being supported at different positions relative to said model.

2. The system of claim 1 wherein said member extends longitudinally opposite the direction of flow in the tunnel.

3. The system of claim 1 wherein said plurality of ports are disposed on an upper portion of said member.

4. The system of claim 1 wherein said plurality of ports are each substantially equally spaced one from the other along the length of said member.

5. The system of claim 4 wherein said plurality of said ports are greater than two in number.

6. The system of claim 1 wherein each of said plurality of said ports are spaced at a distance of about 50 mm.

7. The system of claim 1 wherein each of said plurality of said ports are spaced substantially equally one from the other along the length of said member, and said plurality of said ports are about 39 in number.

8. The system of claim 1 wherein said support for said model is adapted to enable continuous-controlled positioning of the model relative to said member.

9. The system of claim 8 wherein said support for said model is adapted to enable both translation and rotation of said model while maintaining said continuous-controlled positioning.

10. The system of claim 9 wherein said support for said model is adapted to enable translation of said model in the x, y and z dimensions and also to enable angular changes in said model in roll, pitch and yaw while maintaining a substantially constant distance from said member.

11. A method of taking off-body pressure readings from a model in a wind tunnel, said method comprising:
    providing a model;
    securing said model to a support;
    providing a longitudinal member;
    forming a plurality of ports along the length of said member;
    administering a flow of air inside the tunnel;
    initially translating said model in said wind tunnel at an original pitch and an original roll; and
    taking a first set of pressure readings using said longitudinal member while said initially translating step is occurring.

12. The method of claim 11 comprising:
    spacing plurality of ports on said longitudinal member such that each of said plurality is substantially equally spaced relative to a next port.

13. The method of claim 11 comprising:
    providing more than two ports on said longitudinal member.

14. The method of claim 11 comprising:
    spacing said plurality of said ports are spaced at a distance of about 50 mm.

15. The method of claim 11 comprising:
    rotating said model so that said model has one of a new pitch and a new roll; and
    again translating said model at said one of said new pitch and said new roll while taking a second set of readings from said plurality of ports.

16. The method of claim 15 comprising:
    repeating said rotating step a plurality of times to complete a pressure signature.

17. The method of claim 11 comprising:
    selecting a point on the body of said model; and
    maintaining the distance from said point of said model to said member during said translation.

18. The method of claim 17 comprising
    taking a first reading at a first of said ports during said translation;
    maintaining pitch and roll and distance relative to a second port on said member during said translation; and
    taking a second reading from said second port;
    comparing said first reading to said second reading; and
    determining repeatability using said comparing step.

19. A method for taking off-body pressure readings from a model in a wind tunnel, said method comprising:
    positioning said model at an original translational and angular position;
    fixing a first pressure-sensing device in said wind tunnel at a first location;
    fixing a second pressure-sensing device in said wind tunnel at a second location;
    translating said model while maintaining a constant pitch, roll, and yaw;
    taking a first off-body pressure reading using said first pressure-sensing device from a first distance from a point on said model relative to a location of said first pressure-sensing device; and
    taking a second off-body pressure reading using said second pressure-sensing device when said point on said model is at a substantially equal distance from said second pressure sensing device.

20. The method of claim 19 comprising:
    rotating said model so that said model has one of a new pitch and a new roll; and
    again translating said model at said one of said new pitch and said new roll while taking a new set of readings from said first and second ports.

* * * * *